No. 786,077. PATENTED MAR. 28, 1905.
F. WEHMEIER & H. STICKFORT.
SPORTSMAN'S PACKING CASE.
APPLICATION FILED JULY 5, 1904.
2 SHEETS—SHEET 1.
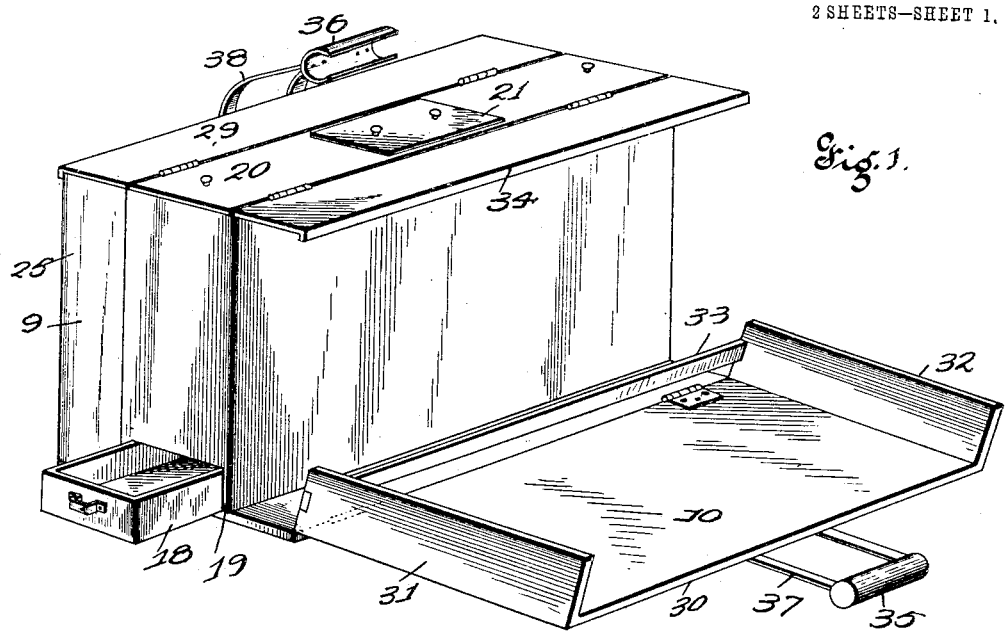

No. 786,077.          PATENTED MAR. 28, 1905.
F. WEHMEIER & H. STICKFORT.
SPORTSMAN'S PACKING CASE.
APPLICATION FILED JULY 5, 1904.
2 SHEETS—SHEET 2.
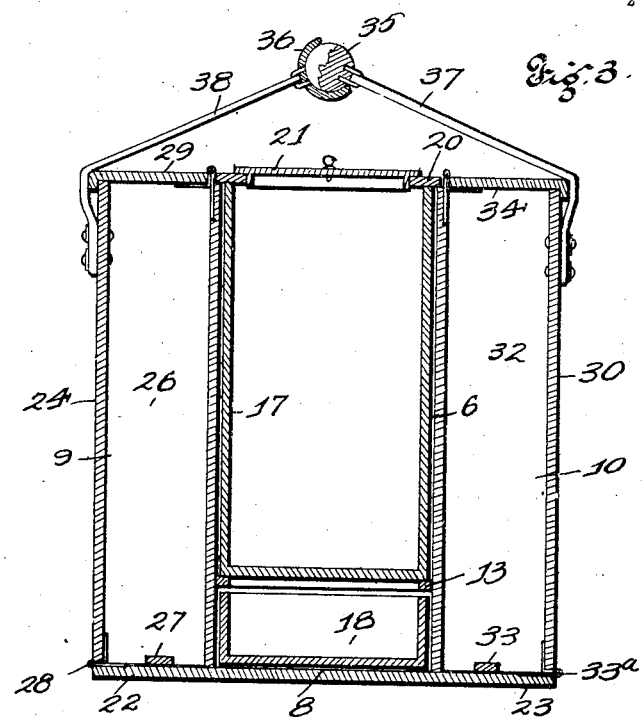
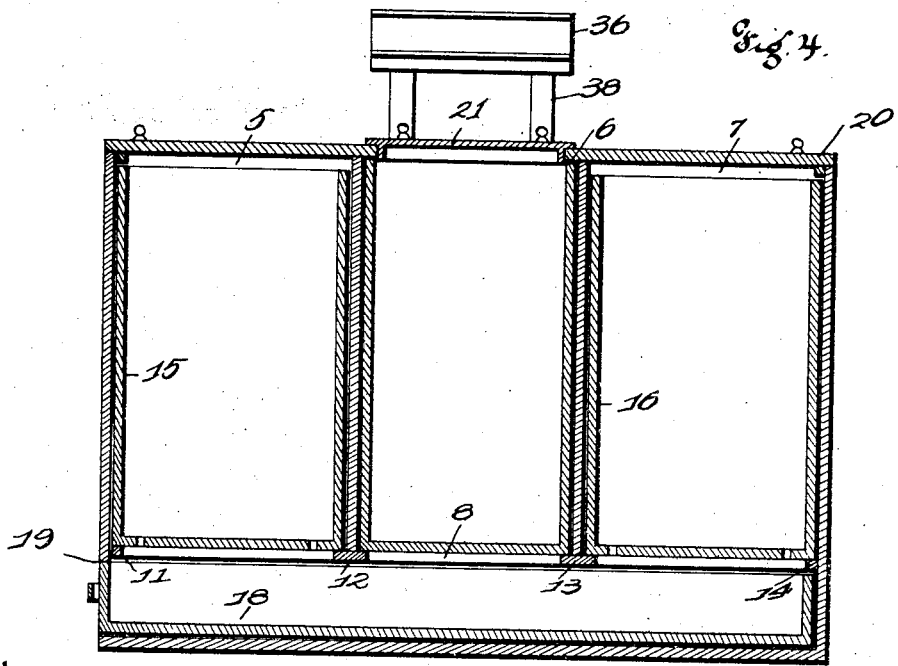

No. 786,077.                                                      Patented March 28, 1905.

UNITED STATES PATENT OFFICE.

FREDRICK WEHMEIER AND HENRY STICKFORT, OF ST. LOUIS, MISSOURI.

SPORTSMAN'S PACKING-CASE.

SPECIFICATION forming part of Letters Patent No. 786,077, dated March 28, 1905.

Application filed July 5, 1904. Serial No. 215,457.

*To all whom it may concern:*

Be it known that we, FREDRICK WEHMEIER and HENRY STICKFORT, citizens of the United States, residing at St. Louis, State of Missouri, have invented certain new and useful Improvements in Sportsmen's Packing-Cases, of which the following is a specification containing a full, clear, and exact description, reference being had to the accompanying drawings, forming a part hereof.

Our invention relates to improvements in sportsmen's packing-cases; and it consists of the novel features herein shown, described, and claimed.

In the drawings, Figure 1 is a perspective of a sportsman's packing-case embodying the principles of our invention, the case being partly open. Fig. 2 is a horizontal section looking downwardly. Fig. 3 is a vertical cross-section. Fig. 4 is a vertical longitudinal section.

Referring to the drawings in detail, our improved sportsmen's packing-case comprises the vertical solid compartments 5, 6, and 7, the horizontal solid compartment 8, extending under the vertical compartments, and the compartments 9 and 10, hinged to the other compartments. The sides of the compartments 5, 6, and 7 may be built up of any suitable material and in any suitable manner, said compartments being preferably arranged in a row, and cleats 11, 12, 13, and 14 form the bottoms of said compartments, said cleats also forming the top of the compartment 8. An ice-box 15 is mounted in the compartment 5, and a similar ice-box 16 is mounted in the compartment 7, said ice-boxes having perforated bottoms to drain water into the compartment 8. A water can or pail 17 is mounted in the compartment 6, and a pan 18 is mounted in the compartment 8, said pan sliding horizontally through an opening 19, and said pan serving to catch the drainage from the ice-boxes. A cover 20 is adapted to close the entire three compartments 5, 6, and 7, and a second cover 21 is adapted to close an opening in the center of the cover 20 and provide access to the compartment 6 without opening the other compartments. The plate forming the bottom of the compartment 8 extends outwardly and forms the supporting-plates 22 and 23. The compartment 9 is formed by the side 24, the ends 25 and 26, the bottom 27, rigidly secured together, said side 24 being connected to the outer edge of the supporting-plate 22 by hinges 28. The cover 29, hinged to the rigid compartments, closes the compartment 9. The compartment 10 comprises the side 30, the ends 31 and 32, and the bottom 33, rigidly secured together, the side 30 being connected to the supporting-plate 23 by hinges 33ª. The cover 34, hinged to the rigid compartments, closes the compartment 10. The bottoms 27 and 33 are narrow strips which will serve to hold bottles and other coarse articles. These narrow strips serve to connect the ends 25 and 26 and the ends 31 and 32 and act as braces to hold the ends in place. A solid bottom might be substituted for each of the strips; but I prefer to use strips, so as to make an open bottom which will not catch dirt and refuse. The handle consists of two separable pieces 35 and 36 and straps 37 and 38, connecting the pieces of the handle to the sides 24 and 30, respectively. The piece 35 is an ordinary round handle, and the piece 36 is a segmental shell adapted to receive the piece 35, so that when the pieces are manually gripped they form a single handle.

If the packing-case is to be used by fishermen, for instance, minnows for bait may be placed in the pail 17, ice may be placed in the ice-boxes 15 and 16, bottles or other closed articles may be placed in the pan 18, and bottles and other articles may be placed in the compartments 9 and 10. By removing the cover 21 access may be had to the minnows without opening the ice-boxes. The cold water draining from the ice-boxes will keep the articles in the pan 18 cool, and the cold radiating from the rigid compartments will cool the articles in the hinged compartments.

We claim—

1. In a device of the class described: a plurality of rigid vertical compartments; a horizontal compartment under the rigid vertical compartments; and hinged means forming compartments connected to the rigid vertical compartments, one on each side; substantially as specified.

2. In a device of the class described: a plurality of rigid vertical compartments; a cover for all of said rigid vertical compartments; a second cover providing access through the first cover to one of said compartments; a horizontal compartment below the rigid vertical compartments; hinged means forming compartments upon each side of the rigid vertical compartments; and a handle comprising two pieces, one piece connected to one hinge-compartment; and the other piece connected to the other hinge-compartment; substantially as specified.

In testimony whereof we have signed our names to this specification in presence of two subscribing witnesses.

FREDRICK WEHMEIER.
HENRY STICKFORT.

Witnesses:
 ALFRED A. EICKS,
 F. C. CRISLER.